United States Patent [19]
Shiraga et al.

[11] Patent Number: 5,084,166
[45] Date of Patent: Jan. 28, 1992

[54] FUEL FILTERING DEVICE

[75] Inventors: Jun Shiraga; Isamu Sato, both of Fukuyama, Japan

[73] Assignee: Mitsubishi Denki Kabushiki Kaisha, Tokyo, Japan

[21] Appl. No.: 482,542

[22] Filed: Feb. 21, 1990

[30] Foreign Application Priority Data

Feb. 22, 1989 [JP] Japan .................. 1-42098

[51] Int. Cl.⁵ .............................. B01D 35/02
[52] U.S. Cl. .................. 210/172; 210/342; 210/349; 210/416.4; 210/461; 210/489; 210/499; 415/119; 415/121.1; 417/312
[58] Field of Search ............... 137/177, 590; 210/172, 210/349, 416.4, 461, 463, 486, 489, 499, 459, 460, 342; 417/312; 415/119, 121.1

[56] References Cited
U.S. PATENT DOCUMENTS 3,023,905  3/1962  McDougal et al. ............. 210/172
3,171,806  3/1965  Schaffner ...................... 210/172

FOREIGN PATENT DOCUMENTS 60-119907  4/1990  Japan.

Primary Examiner—W. Gary Jones
Assistant Examiner—Matthew O. Savage
Attorney, Agent, or Firm—Burns, Doane, Swecker & Mathis

[57] ABSTRACT

In a fuel filtering device for a fuel pump (6) which is arranged in a liquid fuel tank (1) of vehicles and feeds the liquid fuel to an engine, there is provided a screen (17, 23) which is for filtering the liquid fuel (2) and is constituted as a bag with a bottom part thereof disposed in contact with or close to an inside wall of the bottom of the fuel tank and covers a suction opening (16) of a suction tube (15) and at least a part of the suction tube (15), the screen (17, 23) being constructed with a dense web which forms a substantially air-tight liquid film by soaking the liquid fuel (2) which makes contact with at least the bottom part of the screen (17, 23) when the screen is partially immersed in the liquid fuel (2).

5 Claims, 6 Drawing Sheets

1

FUEL FILTERING DEVICE

FIELD OF THE INVENTION AND RELATED ART STATEMENT

1. Field of the Invention

This invention relates to a filtering device for a fuel pump which is arranged and used in a liquid fuel tank of vehicles such as automobiles or the like.

2. Description of the Related Art

FIG. 10 shows an arrangement of a fuel pump and a filtering device, such as disclosed in Unexamined Published Japanese Utility Model Application No. Sho 55-177059. In FIG. 10, numeral 1 designates a fuel tank, numeral 2 a liquid fuel accommodated in the fuel tank 1, numeral 3 a subsidiary tank, numeral 4 a plate secured to an upper opening portion of the fuel tank 1 with a sealing packing 5, and numeral 6 an electric-powered intank-type fuel pump. The fuel pump 6 is secured to the plate 4 with an vibration absorptive cushioning rubber 7 and arranged off the bottom of the fuel tank 1 by a supporting member 8 such as metal frame. The numeral 9 designates a suction tube secured to a suction port 6a of the fuel pump 6. A suction opening 10 of the suction tube 9 opens downwardly and sucks the liquid fuel 2 through a filter 11 which is supported by the suction tube 9. A filtering device is constituted of the suction tube 9 and the filter 11. The numeral 12 designates a delivery pipe for feeding the liquid fuel 2 which is pumped out by the rotation of an impeller (not shown) in the fuel pump 6. The numeral 13 designates a return pipe for returning an unemployed portion of the fuel which has been fed to the engine to the fuel tank 1.

In the above-mentioned conventional filtering device, when the fuel level lowers below the suction opening 10 owing to consumption of the fuel 2, the fuel pump 6 can not suck the fuel 2. Thereby, the vehicle can not run even with the fuel remaining in a space between the suction opening 10 and the bottom of the fuel tank 1. In this aspect, it is desirable to arrange the suction opening 10 as close as possible to the bottom of the fuel tank 1 by extending the suction tube 9.

Since the conventional filtering device is designed as described above, vibration and noise developed by the fuel pump 6 are fundamentally absorbed by the cushioning rubber 7 and the sealing packing 5. Thus, it is expected that the vibration and the noise are not transmitted to the outside of the fuel tank 1. However, the problem has been that the suction opening 10 faces the bottom of the fuel tank 1 with the filter 11 put therebetween. Accordingly, a noise of friction between the impeller and the bubbles caused by the rotations of the impeller in the fuel pump 6 during the sucking and pumping-out of the fuel 2, or a noise of the rotation of the fuel pump 6 itself propagates through the suction tube 9. And these noises go out from the suction opening 10 to the bottom surface the fuel tank 1. Since the liquid fuel 2 is good medium for conducting these noises, the energy conductivity is good, so that these noises considerably vibrate the bottom surface of the fuel tank 1 and problematically develop noises unpleasant to a vehicle driver. If the gap between the bottom surface of the fuel tank 1 and the suction opening 10 were increased in order to disperse and damp the noise energy, an unusable remainder of the liquid fuel 2 were problematically increased. If the suction opening 10 is arranged near the bottom surface of the fuel tank 1, the noise developed by the suction is increased.

OBJECT AND SUMMARY OF THE INVENTION

This invention has been made to solve problems in the conventional filtering device for a fuel pump such that a sound wave of noise emitted out of the suction opening undesirably vibrates the bottom of the fuel tank, and furthermore, to decrease inefficient remainder of the fuel.

In order to achieve the above-mentioned objects, a fuel filtering device for the fuel pump in accordance with the present invention comprises:

a suction tube which is connected to be extended from a suction port of the fuel pump and has an upwardly directed suction opening; and a screen which is for filtering the liquid fuel 2 and is constituted as a bag with a bottom part thereof disposed in contact with or close to an inside wall of the bottom of the fuel tank and covers the suction opening and at least a part of the suction tube, the screen being constructed with a dense web which forms a substantially air-tight liquid film by soaking the liquid fuel 2 which makes contact with at least the bottom part of the screen when the screen is partially immersed in the liquid fuel.

According to the present invention, an upwardly directed suction opening of the suction tube upwardly emit or disperse the noise which has come out of the fuel pump through the suction tube, and the air-tight liquid film formed by soaking of the liquid fuel on the dense web of the screen restricts the air-inflow into the screen, thereby to raise the fuel level in the bag of the screen; therefore, the fuel suction tube can suck the fuel without propagating large noise to the bottom wall of the fuel tank even when the level of the remaining fuel liquid becomes low.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
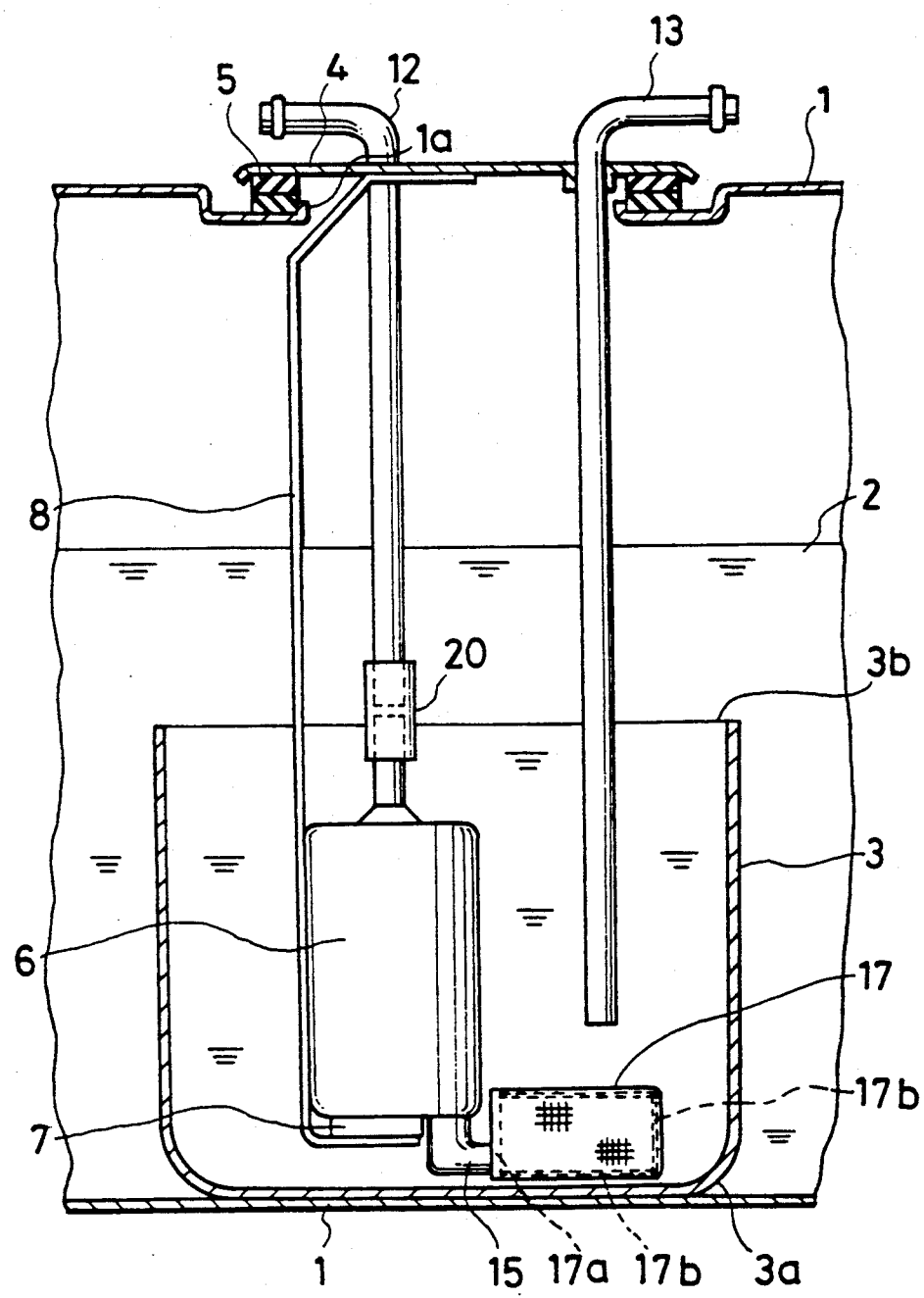
FIG. 1 is a side view showing a fuel tank 1 including a fuel filtering device of the present invention.

FIG. 1 is a side view showing a liquid fuel filtering device as a first embodiment of the present invention. Although the fuel tank 1 is of generally rectangular shape elongated in the elevation view, only a pertinent part thereof to the present invention is shown in an enlarged manner. In FIG. 1, a liquid fuel 2 is stored in the fuel tank 1, and a cup-shaped subsidiary tank 3 is fixed to the fuel tank 1. The subsidiary tank 3 has a hole (not shown), which makes fuel-communication between an inside and an outside of the subsidiary tank 3, at a lower wall part 3a. A plate 4 is secured to an upper opening portion 1a with a sealing packing 5. An electric-powered in-tank-type fuel pump 6 is secured to the plate 4 with an vibration absorptive cushioning rubber 7 and arranged off the bottom of the subsidiary tank 3 by a supporting member 8 such as metal frame. A delivery pipe 12, which couples with the fuel pump 6 via a rubber hose 20, feeds the liquid fuel 2 which has been pumped out by the rotation of an impeller (not shown) in the fuel pump 6. A return pipe 13 is secured to the plate 4 and is used for returning an unemployed portion of the fuel which has been fed to an engine (not shown) to the fuel tank 1. A fuel filtering device is mainly constituted of a suction tube 15 and a filter 17. The liquid fuel 2 in the subsidiary tank 3 is sucked into the fuel pump 6 through the filter 17 and the suction tube 15.

Figure 1A:
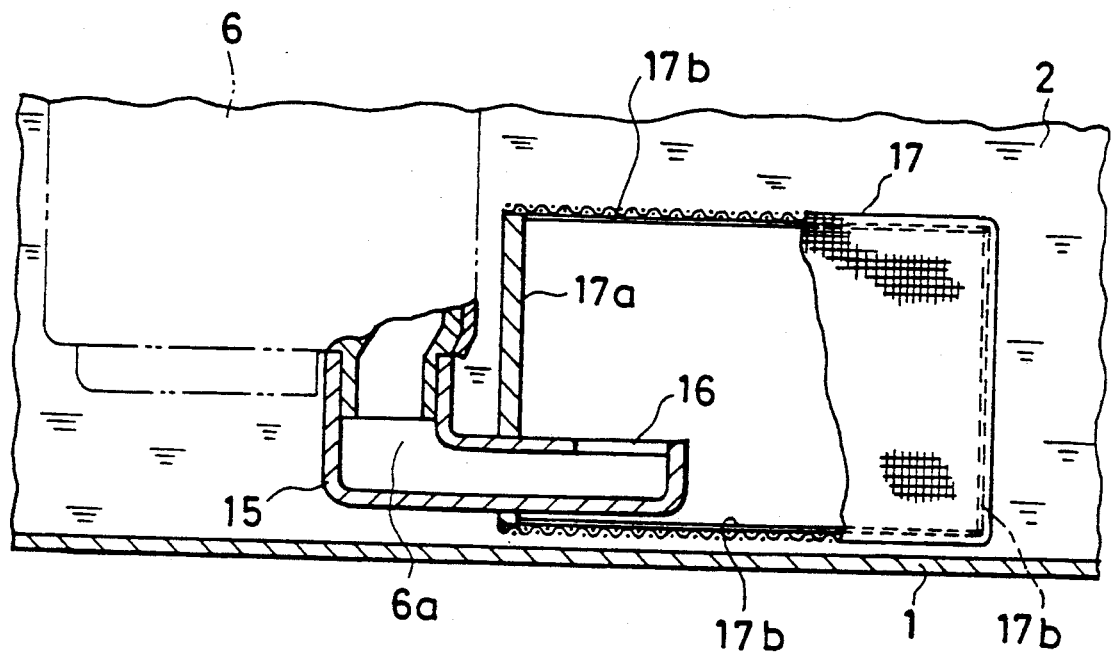
FIG. 1A and FIG. 2 are a side view and a plane view showing a fuel filtering device as an embodiment of claim 1 of the present invention.
Figure 2:
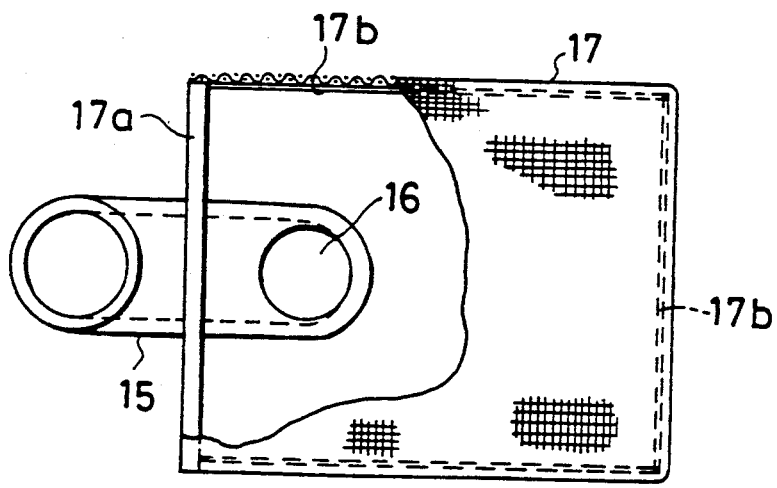

FIG. 1A is a partially enlarged cross-sectional side view showing the fuel filtering device, and FIG. 2 is a plane view showing main parts in FIG. 1A. A suction tube 15 is secured to a suction port 6a of the fuel pump 6, and a suction opening 16 of the suction tube 15 is provided at the front end thereof in upward direction. A bag or box-shaped screen 17, which is made with a net of dense web, is provided to enclose the suction opening 16 and the suction tube 15 in a manner to have a given volume therein. The screen 17 is made of a dense web, such as those having trade name: "Nippu Strong Net" made by NBC Kogyo Co., Ltd. of Japan, which is a twill-woven net of 164×45 meshes per inch, or plain-woven net of 194×40 meshes per inch, of polyethylene or nylon fibers. The bag-shaped screen 17 has a plate-shaped supporter 17a fixed to the suction tube 15, and preferably has rod-shaped frames 17b, for keeping its shape of bag to retain the given capacity inside.

In the above-mentioned embodiment of the fuel filtering device of the fuel pump, a noise induced by the impeller in the fuel pump 6 or a rotation noise of the fuel pump 6 itself propagates through the suction tube 15, and is emitted to disperse upwardly from the suction opening 16, and hence, a sound energy does not vibrate a bottom surface of the fuel tank 1. When the level of the surface of the liquid fuel 2 lowers below the suction opening 16 as a result of fuel consumption, the dense web of the screen 17 which soaks the liquid fuel 2 at its bottom part forms an air-restricting film thereon by the surface tension of the liquid fuel 2 and restricts the air pass through the screen 17. On the other hand, the liquid fuel 2 can freely passes through the web of the screen 17 at the part immersed in the liquid fuel 2. Accordingly, when the negative pressure is developed by the suction of the fuel pump 6, the liquid fuel 2 is sucked into the bag of screen 17 through the immersed part, whereby the surface of the fuel liquid 2 inside the bag of screen 17 rises above the level of the fuel liquid 2 at the outside. Therefore, the fuel liquid 2 flows into the fuel pump 6 through the suction opening 16, which is provided in upward direction, and is supplied to the engine.

Since the present invention uses the screen 17 made with the high-dense web, which has a certain resistance to the flow-in of the liquid fuel 2 therethrough and also a certain mechanical resistance against motions of its web face in the direction perpendicular to a plane of the web, the screen 17 itself serves to absorb and damp the sound energy of the noise, as a mechanical noise suppressing means.

Figure 3:
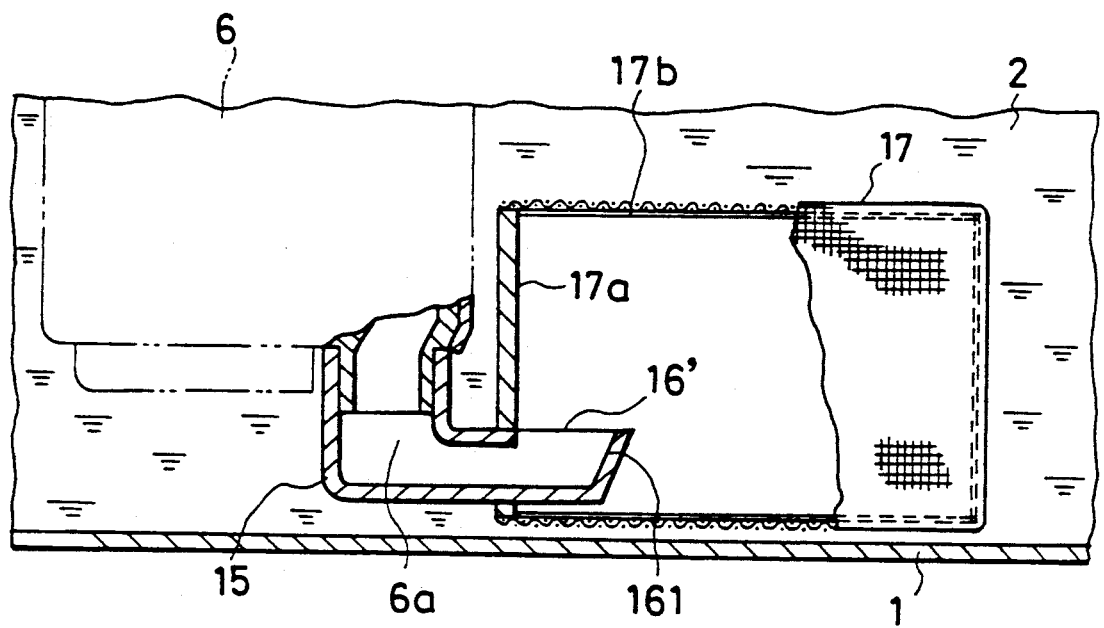
FIG. 3 is a side view showing a fuel filtering device as another embodiment of claim 1 of the present invention.

FIG. 3 is a side view showing a fuel filtering device of another embodiment of the present invention. Corresponding parts and components to the first embodiment are shown by the same numerals and marks, and the description thereon made in the first embodiment similarly applies. Differences and features of this second embodiment from the first embodiment are as follows. A suction tube 15 secured to a suction port 6a of the fuel pump 6 has a suction opening 16' and has an end wall 161 shaped in an upwardly flared wall. The upwardly flared slant wall 161 upwardly disperses the noise, and therefore eliminate propagation of noise to the bottom wall of the fuel tank 1. The end wall 161 is slanted outwardly relative to a central axis of the upwardly directed suction opening 16'.

Since other functions of this embodiment are similar to those of the above-mentioned first embodiment, other explanations similar thereto are omitted.

Figure 4:
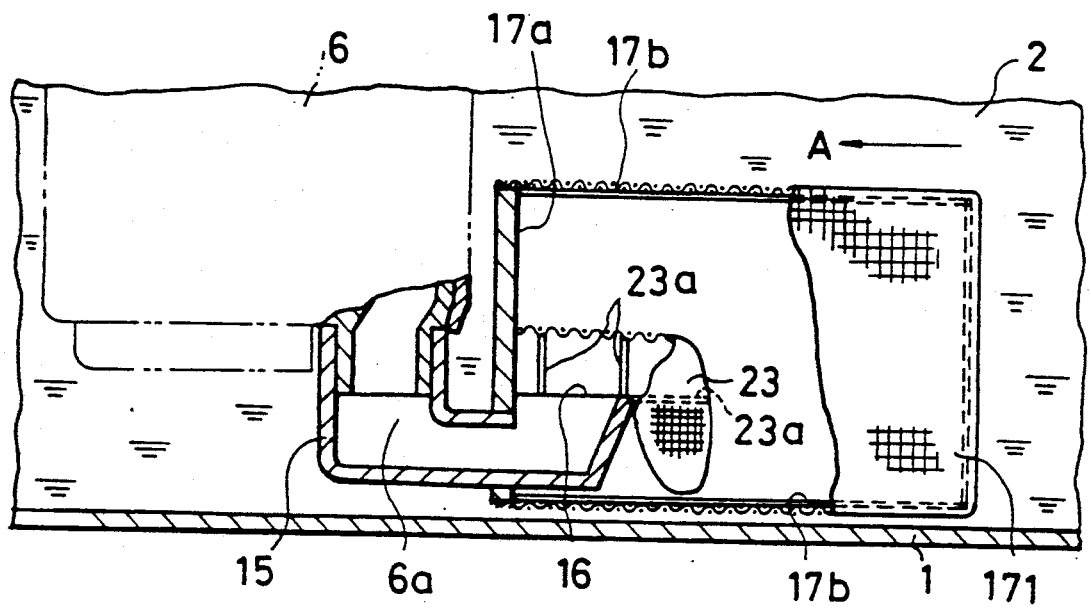
FIG. 4 and FIG. 5 are a side view and a plane view showing a fuel filtering device of an embodiment of claim 2 of the present invention.
Figure 5:
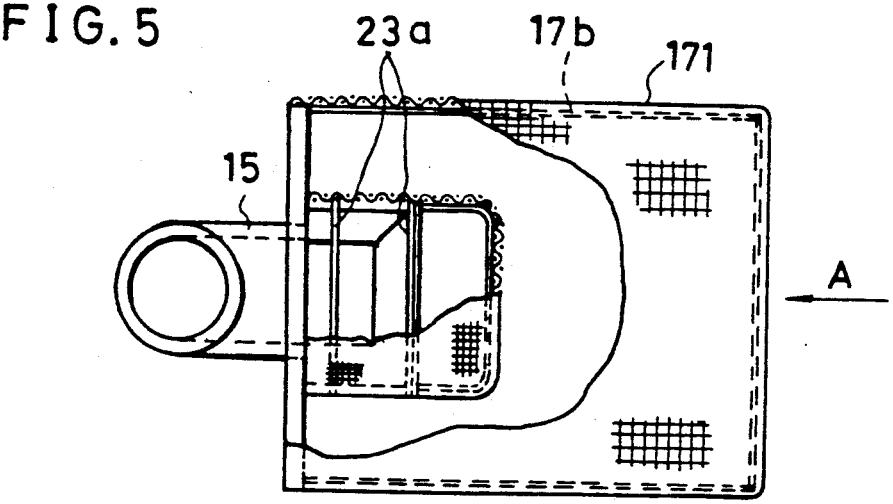
Figure 6:
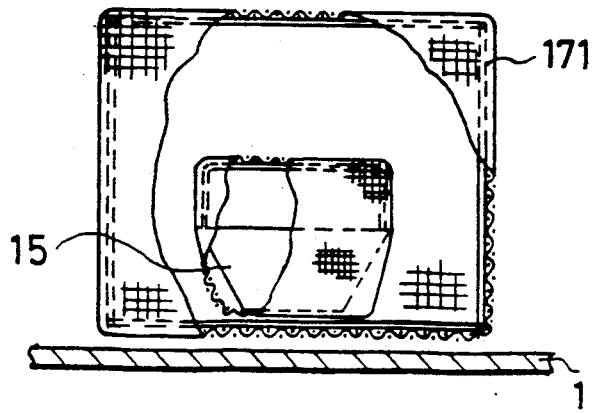
FIG. 6 is a sectional view showing a portion of the device of FIG. 4 as viewed from a direction of an arrow A.

FIG. 4 and FIG. 5 are a side view and a plane view showing a fuel filtering device of still other embodiment of the present invention, respectively, and FIG. 6 is a fragmental front view showing a bag-shaped screen 23 of the device of FIG. 4 and FIG. 5 as viewed from a direction of an arrows A. Corresponding parts and components to the first embodiment are shown by the same numerals and marks, and the description thereon made in the first embodiment similarly applies. Differences and features of this third embodiment from the first embodiment are as follows. In this third embodiment, the bag-shaped screen 23 is provided on the suction opening 16 and continuously suspended down to the bottom part of the fuel tank 1. The bag-shaped screen 23, which is made with a net of dense web, is provided to enclose the suction opening 16 in a manner to have a predetermined volume therein. The screen 23 is made by a dense web, such as those having trade name "Nippu Strong Net" made by NBC Kogyo Co., Ltd. of Japan, which is a twill-woven net of 164×45 meshes per inch, or plain-woven net of 194×40 meshes per inch, of polyethylene or nylon fibers. The screen 23 has preferaby rod-shaped frames 23a to keep its shape of bag against negative pressure which is induced by the fuel pump 6. An outside anti-dust filter 171 (a cover), constructed with a net sheet for example, which is shaped similar to the screen 17 of the foregoing embodiments but having larger meshes than the bag of screen 23, is provided to contain the suction tube 15 and the screen 23 therein. A supporter 17b for keeping the shape of box of the filter 171 is fixedly provided to the suction tube 15.

In the above-mentioned embodiment of the fuel filtering device of the fuel pump, the noise induced by the impeller in the fuel pump 6 or the rotation noise of the fuel pump 6 itself propagates through the suction tube 15, and is emitted to disperse upwardly from the suction opening 16, and hence, the sound energy does not vibrate the bottom surface of the fuel tank 1. When the level of the surface of the liquid fuel 2 lowers below the suction opening 16 as a result of fuel consumption, the dense web of the screen 23 which soaks the liquid fuel 2 at its bottom part forms an air-restricting film thereon by the surface tension of the liquid fuel 2 and restricts the air pass through the screen 23. On the other hand, the fuel liquid can freely passes through the web of the screen 23 at the part immersed in the liquid fuel 2. Accordingly, when the negative pressure is developed by the suction of the fuel pump 6, the liquid fuel 2 is sucked into the bag of screen 23 through the immersed part, whereby the surface of the fuel liquid 2 inside the bag of screen 23 rises above the level of the fuel liquid 2 at the outside. Therefore, the fuel liquid 2 flows into the fuel pump 6 through the suction opening 16, which is provided in upward direction, and is supplied to the engine. Therefore, the liquid fuel 2 can be sucked efficiently until it comes to very low level of its surface, with smaller use of the expensive special screen web in comparison with the foregoing embodiments.

Figure 7:
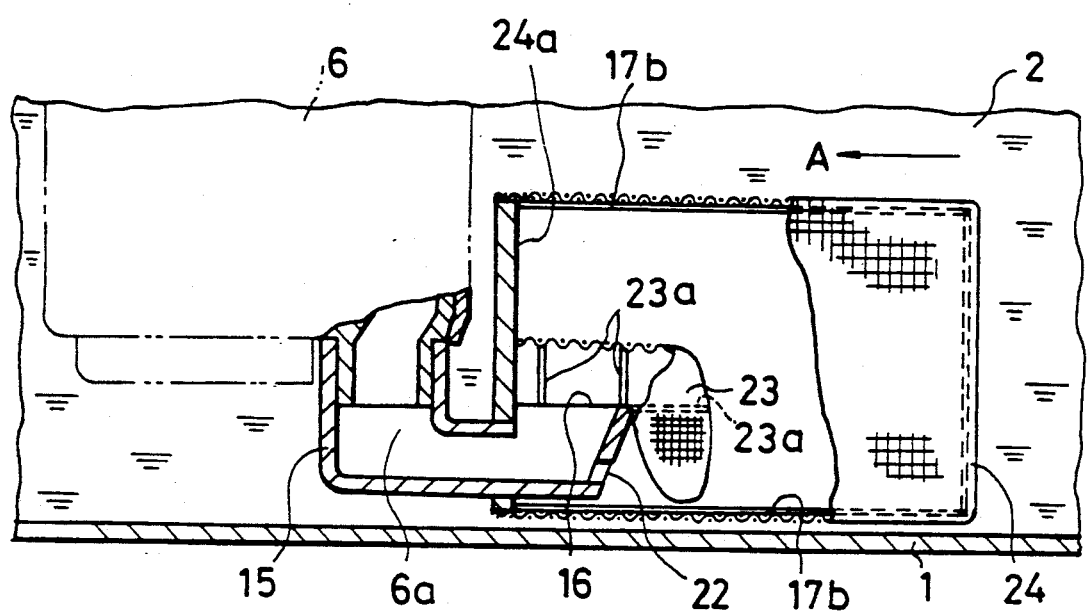
FIG. 7 and FIG. 8 are a side view and a plane view showing a fuel filtering device of another embodiment of claim 2 of the present invention.
Figure 8:
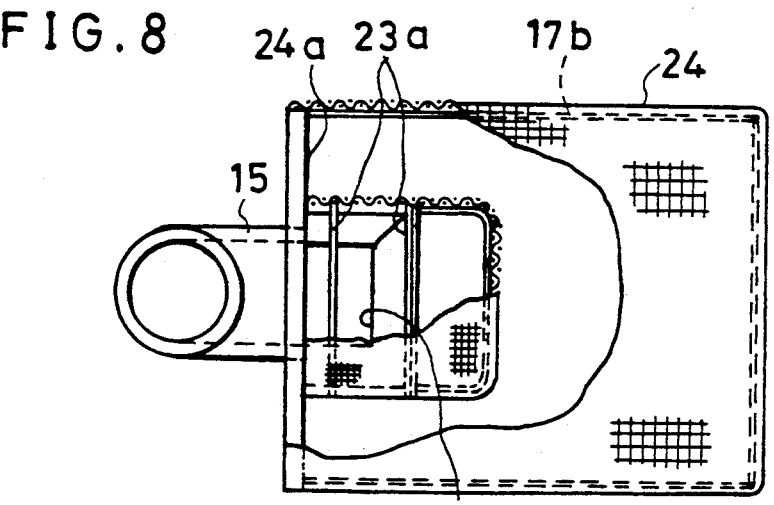
Figure 9:
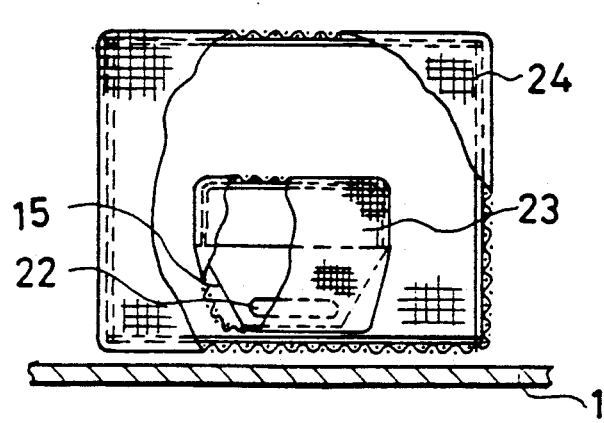
FIG. 9 is a sectional view showing a portion of the device of FIG. 7 as viewed from a direction of an arrow A.
Figure 10:
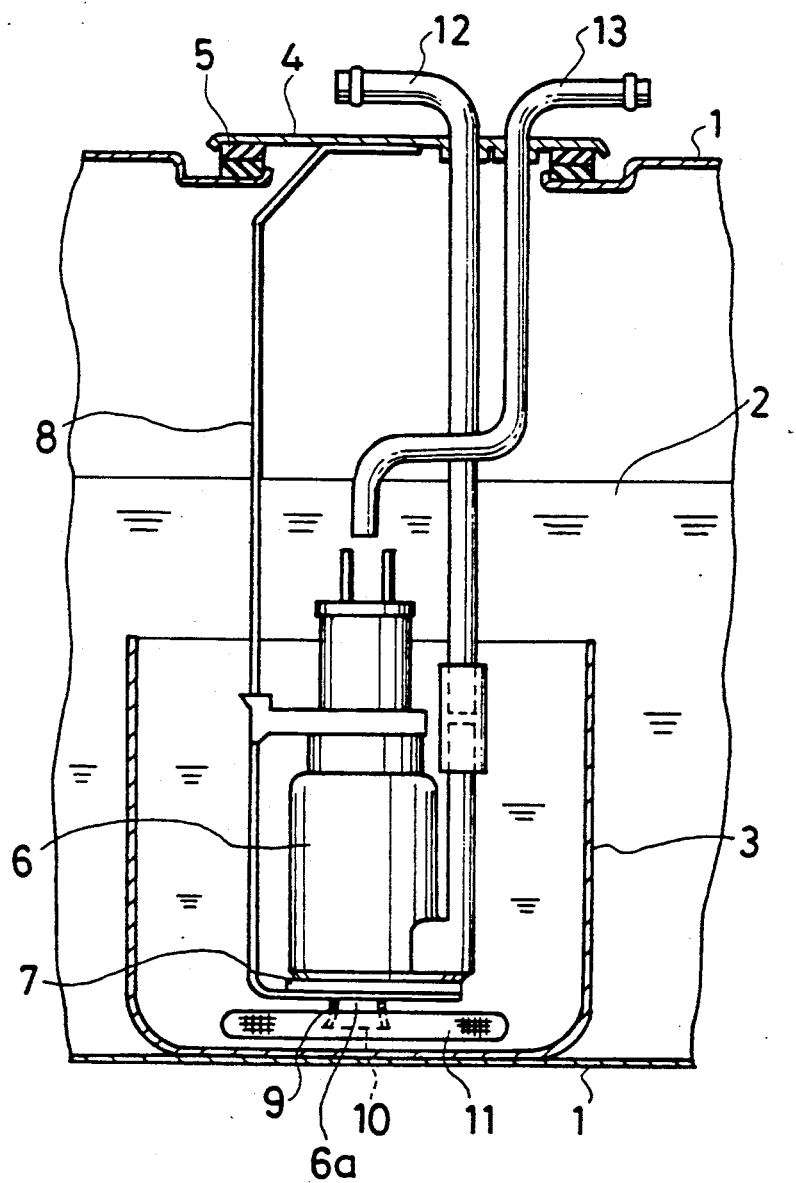
FIG. 10 is a view showing a fuel tank including the the conventional fuel filtering device.

FIG. 7 and FIG. 8 are a side view and a plane view showing a fuel filtering device of still other embodiment of the present invention, respectively, and FIG. 9 is a fragmental front view showing a bag-shaped screen 23 of the device of FIG. 7 and FIG. 8 as viewed from a direction of an arrows A. Corresponding parts and components to the first embodiment are shown by the same numerals and marks, and the description thereon made in the first embodiment similarly applies. Differences and features of this fourth embodiment of FIGS. 7, 8 and 9 from the third embodiment (FIGS. 4, 5 and 6) are as follows. The feature of this embodiment is that a lower suction opening 22 is provided at the bottom front end part of the suction tube 15. The lower suction opening 22 enables sucking of the liquid fuel 2 therethrough with substantially low flow resistance at the time when the surface level of the liquid fuel 2 goes down very low and an area of touching by the bag of screen 23 to the liquid fuel 2 decreases thereby increasing resistance of flowing in of the liquid fuel 2 into the bag of screen 23. Therefore, the liquid fuel 2 can be sucked efficiently until it comes to very low level of its surface, with smaller use of the expensive special screen web in comparison with the foregoing embodiments.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An apparatus comprising:
a fuel pump which is located in a liquid fuel tank for vehicles and feeds liquid fuel to an engine;
a suction tube connected to and extending from a suction port of the fuel pump and having an upwardly directed suction opening; and
a fuel filtering device comprising a bag-shaped screen for filtering said liquid fuel, said bag-shaped screen having a bottom part disposed proximate to a bottom wall of said fuel tank and covering said suction opening and at least a part of said suction tube, said bag-shaped screen being constructed with a dense web which forms a substantially air-tight liquid film when soaked with said liquid fuel.

2. An apparatus comprising:
a fuel pump which is located in a liquid fuel tank for vehicles and feeds liquid fuel to an engine;
a suction tube connected to and extending from a suction port of the fuel pump and having an upwardly directed suction opening;
a fuel filtering device comprising a bag-shaped screen for filtering said liquid fuel, said bag-shaped screen having a bottom part disposed proximate to a bottom wall of said fuel tank and covering said suction opening, said bag-shaped screen being constructed with a dense web which forms a substantially air-tight liquid film when soaked with said liquid fuel; and
a cover which is constructed with a net sheet and encloses said bag-shaped screen and a substantial part of said suction tube.

3. An apparatus in accordance with claim 2, wherein said suction tube has a lower suction opening at its lowest part of an end wall thereof, said end wall being slanted outwardly with respect to a central axis of said upwardly directed suction opening and being enclosed by said cover.

4. A fuel filtering device comprising:
a fuel pump arranged in a liquid fuel tank of a vehicle and feeding liquid fuel to an engine;
a suction tube connected to a suction port of the fuel pump and having an upwardly directed suction opening and a lower suction opening at is lowest part of an end wall thereof;
a fuel filtering device comprising a bag-shaped screen for filtering said liquid fuel, said bag-shaped screen including a bottom part disposed proximate to a bottom wall of said fuel tank and covering said suction opening, said bag-shaped screen being constructed with a dense web which forms a substantially air-tight liquid film when soaked with said liquid fuel.

5. A fuel filtering device as claimed in claim 4 wherein said end wall is slanted outwardly with respect to a central axis of said upwardly directed suction opening.

* * * * *